Oct. 15, 1935.  J. F. KÖHNKE  2,017,626

PIPE COUPLING FOR SCAFFOLDS AND THE LIKE

Filed April 6, 1934

INVENTOR: J. F. Köhnke
BY: Marks & Clerk

Patented Oct. 15, 1935

2,017,626

UNITED STATES PATENT OFFICE 2,017,626

PIPE COUPLING FOR SCAFFOLDS AND THE LIKE

Johan Friedrich Köhnke, Haarlem, Netherlands

Application April 6, 1934, Serial No. 719,377
In the Netherlands April 12, 1933

3 Claims. (Cl. 189—36)

This invention relates to scaffolding formed of pipes, tubes, bars or the like.

With the forms of steel scaffoldings now coming into use it is necessary to apply special couplings for mutually coupling the pipes, bars and like members of which the scaffoldings are composed, to form particularly the cross couplings between the uprights and the crossbeams. For this coupling a crosspiece has already been used having two semi-cylindrical grooves at right angles to each other for the reception of the pipes which are to be clamped to the said cross piece by means of complemental semi-cylindrical clips which are hinged to the cross piece. This construction, is however, comparatively expensive.

Further pipe couplings are known whereby a single clamping clip is used which fits around one of the pipes and in which in a transverse direction, slots are provided in which the other pipe is arranged. The clamping is effected by inserting specially formed locking pieces in eyes, or hooks and eyes, of the clamping clip and by screwing in a bolt in the clamping piece. These constructions are likewise comparatively expensive and moreover not adapted to couple two pipes in line.

The invention relates to a pipe coupling consisting of a central piece provided with two arcuate grooves which cross each other at 90°, and upon which each of two pipes may be clamped by means of clamps having arcuate grooves, and is intended to eliminate the said inconveniences.

The invention consists in this that each clamp is provided with four extensions of which, if the clamp is placed around one of the pipes arranged in the arcuate grooves of the central piece, the extensions project beyond the central piece, and that the extensions are provided with slots so that each pipe may be clamped by two wedges arranged parallel to the other pipe.

In the accompanying drawing an example of a coupling according to the invention is shown, in which.

Figure 1:
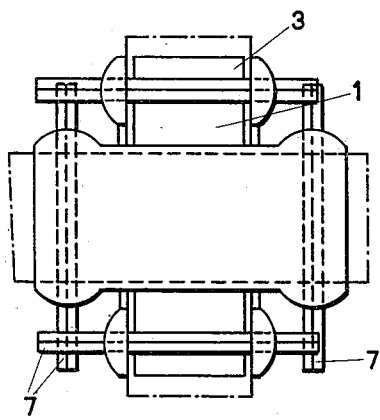
Figure 1 is a view of the assembled pipe coupling.
Figure 2:
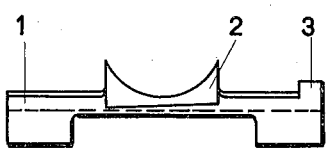
Figure 2 is a side elevational view of the central piece.

The central piece, shown in Figure 2, has two mutually perpendicular arms 1 and 2, which are arranged in the form of a cross and are provided with longitudinally extending arcuate grooves, in which fit the pipes to be coupled. The arms of the central piece are bevelled at the rear side to secure a good fitting of the wedges. Further the arm 1 is provided with a projection 3 which has the purpose of facilitating the mounting; to this end the central piece is mounted with the arm 1 in a vertical direction and the projection 3 upwards. If after the placing of one clamp in position the topmost wedge is driven in to a small extent, the central piece will rest hanging with the projection upon the wedge and it may be released.

Figure 3:
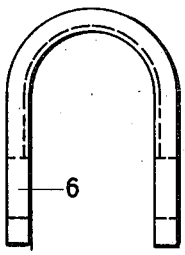
Figures 3 and 4 are respectively end and side elevational views of one of the clamps.
Figure 4:
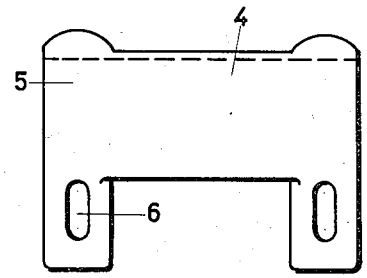
Figure 6:
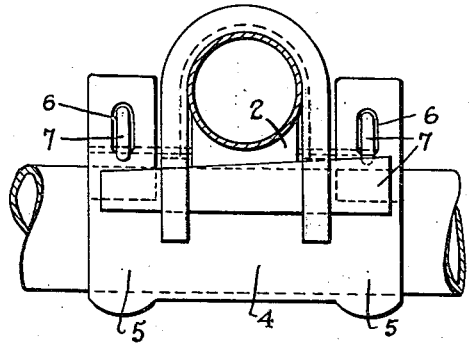
Figure 6 is a side elevational view of the arrangement shown in Figure 1, Figures 7 and 8 are side and end elevational views of an auxiliary piece.

Each clamp consists of a plate bent in the form of a horseshoe magnet, with extensions in which the slots are arranged to take the wedges. To economize on material the ends and extensions of each clamp may be given a greater thickness than the central part, for in these places the clamping pressure is exerted. This modification is shown in the drawing. In Figures 3 and 4 the central part of the clamp is indicated by 4, the reinforced ends with extensions by 5 and the slots by 6. The extensions are so long that the slots 6 extend so far below the arms of the central piece, after the placing of the desired clamp over the pipe, that by the inserting of the wedges, the necessary clamping effect is obtained.

Figures 5, 8:
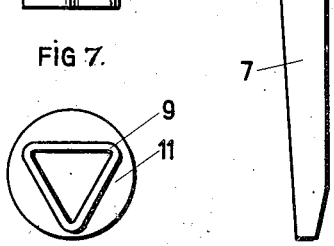
Figure 5 is an elevational view of one of the wedges.

One of the wedges is shown in Figure 5 and by preference is made out of a doubly bent plate with a bevel equalling that of the arms of the central piece. The advantage of a doubly bent wedge is that this may be locked in the manner of a split pin.

The erection of a scaffolding is effected as follows:

The uprights are placed upon the foundation plates (not shown). After this the crossbeams must be arranged at working floor height for which purpose at this height a central piece with its arcuate groove is held against the upright with the projection 3 upwards, while one clamp is pushed over the upright and the top wedge is forced into the slots 6 and lightly driven in. Then the bottom wedge is inserted and both the wedges are driven in and eventually locked. Now the crossbeam is held against the arm 2 and is clamped in the already described manner with the other clamp and wedges. The cross pipes (putlogs) are coupled with the crossbeams in a similar manner. If struts are necessary these are arranged between cross pipes, the central piece being fastened to the cross pipe at the desired angle.

By the coupling according to the invention the effect is attained that the clamping pressure is exerted at the ends of the clamp. The parts may be made by mass production and as they have no screw threads, they may thus be produced cheaply. The clamp may be punched out of a strip rolled to the desired profile and brought into the desired form by bending. The fastening is effected in a simple manner by the arrangement of the clamp and driving in of the wedges, so that time in erection is saved.

To facilitate the mounting, the bevelling of the arm 1 (projection 3 upwards) may taper off from left to right and that of the horizontal arm 2 from the lower edge to the upper edge. Hereby is attained, that the horizontal wedges may be inserted from the right side and the vertical wedges from above to below, so that there is no need to ascertain the right fastening position on account of the bevelling.

Figure 7:
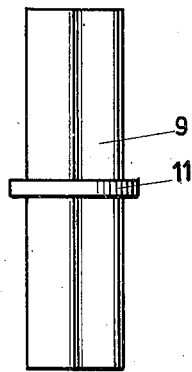

If two pipes must be coupled in line, a similar central piece is used, in this case however with one clamp. Because the clamping pressure is exerted at the ends of the clamp, a good clamping of both pipes is ensured and any loosening thereof is practically out of the question. To facilitate this mounting, the auxiliary piece shown in Figures 7 and 8 is used. This consists of a preferably triangular pipe piece 9, upon which in the centre a collar 11 is welded. The outer circumference of this collar equals the outer circumference of the pipes to be coupled. The pipe piece is inserted into the pipe and rests with its collar against the end of the pipe. Over the extending end the other pipe is pushed and then the coupling is completed.

If the slots 6 after use tend to become too long they may again be brought back to proper length by welding in of additional metal.

The coupling may be dismounted after use by knocking loose the wedges and may be used again and again, whilst in the case of the possible fracture of a part, it may be replaced without any great expense.

Having now described my invention what I claim as new and desire to secure by Letters Patent is:

1. For use in scaffolding of the kind referred to, a pipe coupling consisting of a central piece provided with two arcuate grooves which cross each other at 90°, and upon each of which one pipe may be clamped by means of a clamp of horse-shoe shape, characterized in that each clamp is provided with four extensions of which, if the clamp is placed around one of the pipes arranged in the grooves of the central piece, one extends past the central piece in each quadrant formed by the two pipes, and that the extensions are provided with slots so that each pipe may be clamped by two wedges arranged parallel to the other pipe.

2. Pipe coupling according to claim 1, in which the central piece includes two arms arranged in cross formation and in which the end of one of the arms is provided with a projection on the side remote from the groove.

3. A pipe coupling in accordance with claim 1, in which the central piece includes two arms arranged in cross formation, one of the arms being provided with a projection on the side remote from the groove, the sides of the arms remote from the grooves being bevelled in such a way that when facing the projection and if the arm provided with the projection is arranged vertically and upwards, the wedges may be driven in from right to left or from above to below.

JOHAN FRIEDRICH KÖHNKE.